United States Patent [19]
Jacobsmeyer, Jr.

[11] Patent Number: 5,687,893
[45] Date of Patent: Nov. 18, 1997

[54] PACKAGE RESTRAINT FOR USE IN AUTOMOTIVE VEHICLES

[76] Inventor: Donald W. Jacobsmeyer, Jr., 1117 Timberlane Dr., St. Louis, Mo. 63122

[21] Appl. No.: 613,342

[22] Filed: Mar. 11, 1996

[51] Int. Cl.$^6$ .................................................... B60R 7/00
[52] U.S. Cl. .................. 224/275; 211/195; 224/42.34
[58] Field of Search ..................... 224/275, 42.34, 224/42.33, 42.4; 211/195, 71, 51; 206/600, 557; 108/44, 55.1

[56] References Cited

U.S. PATENT DOCUMENTS

| | | | |
|---|---|---|---|
| 2,822,968 | 2/1958 | Jackson | 224/275 |
| 2,912,151 | 11/1959 | Crabs | 211/51 |
| 3,841,477 | 10/1974 | Stark et al. | 206/557 |
| 3,934,771 | 1/1976 | Eberhard | 224/275 |
| 4,254,872 | 3/1981 | Garrett | 224/275 |
| 4,535,896 | 8/1985 | Evenson | 211/195 |
| 4,813,751 | 3/1989 | Fenn | 108/44 |

*Primary Examiner*—Linda J. Sholl
*Attorney, Agent, or Firm*—Polster, Lieder, Woodruff & Lucchesi

[57] ABSTRACT

A package restraint (10) is for use in automotive vehicles. The restraint is placed in a seat (S) normally occupied by an individual and is held in place by the seat belt (B) worn by an occupant. The restraint has a rear piece (12) which fits against the upright portion of a passenger seat and which is held in place by the seat belt. A bottom section (16) of the restraint provides a seat for the package (P) or article to rest upon. The length of this bottom section may be adjustable to accommodate different size packages. A front section (18) of the restraint is also an upright piece. The front and rear pieces have openings (24a–24d) for a belt (22) to fit through the pieces and about the package to secure the restraint and package together. The restraint is made of a lightweight, fabric covered material for ease of use and to protect the package and seat in which the restraint is used. The belt is of a non-slip material so as not to fall off the package once secured thereto. The restraint protects the package and its contents from damage which might otherwise result from the rapid acceleration, sharp turns, or abrupt stoppages which may occur when the vehicle is moving.

17 Claims, 3 Drawing Sheets

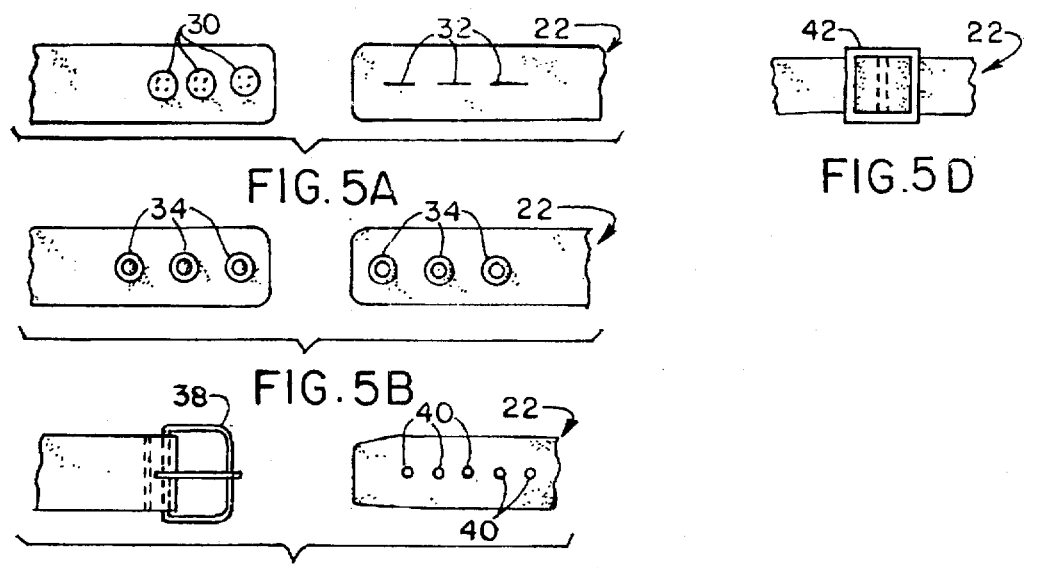
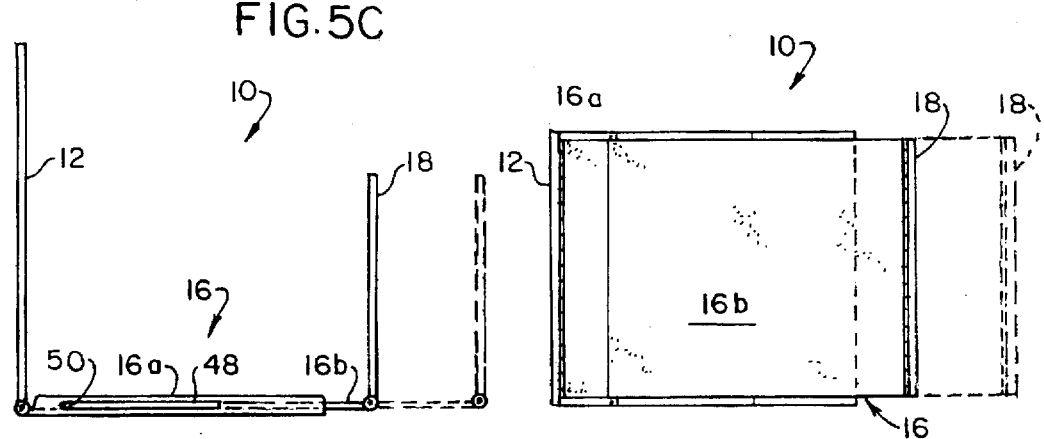
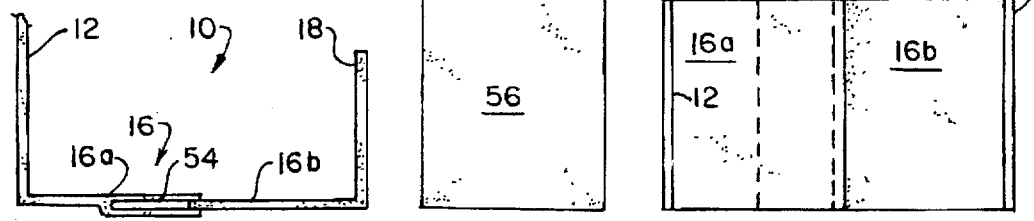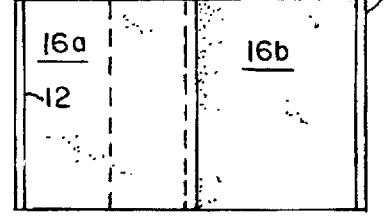
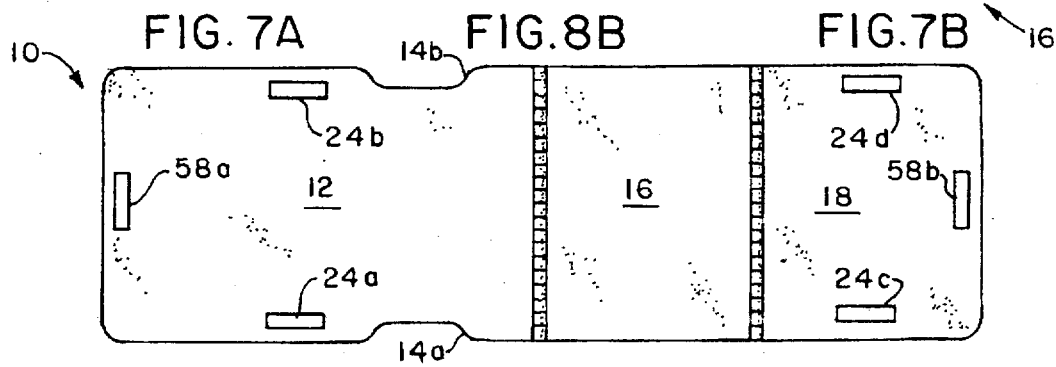

1

PACKAGE RESTRAINT FOR USE IN AUTOMOTIVE VEHICLES

BACKGROUND OF THE INVENTION

This invention relates to the carrying of various types of articles such as files, merchandise displays, portable computers and the like in vehicles such as automobiles, trucks, airplanes, etc., and more particularly, to a restraint device for securing any of these objects in a seat of the vehicle.

Child restraining seats are well-known in the art and are used, particularly in the passenger compartment of automobiles, for securing infants or small children so they are safe from harm in the event of an accident. It is also commonplace for people to carry various other items (fragile items, luggage, coolers) in the passenger compartment which they may also want to protect. In this instance, the protection is not so much against injury or damage as it is to have the item readily available. A salesman, for example, may want to keep his sample case, customer files, his personal computer next to him in the front seat of his car. And, it is important to him as he travels from one place to another that this material be kept in some order and not be displaced as he makes turns, sudden stops, and so forth. Elderly persons, or those with handicaps, may need to transport articles such as groceries, for example, but cannot readily put these articles into, or retrieve them from, the trunk of their car. They also may not be able to place them on the floor of the car or lay them on the back seat. Or, if they do, they would have trouble retrieving articles that may fall out of a grocery bag which tips over on the trip from the store to their home. It would therefore be advantageous to provide some type of article carrier or package restraint which would make it easier for these people to place something in the seat of a car and know they can transport the article from one place to another without worrying about it being damaged in transit or being dislodged so that they have to retrieve it from someplace at which they cannot easily get.

SUMMARY OF THE INVENTION

Among the several objects of the present invention may be noted the provision of an article carrier or package restraint for use in automotive vehicles such as cars, vans, trucks, and even airplanes;

the provision of such a restraint to be held in place in a passenger seat using a seat belt normally worn by a passenger;

the provision of such a restraint to be an adjustable restraint capable of holding various types of articles or packages of different sizes and shapes;

the provision of such a restraint which allows material or articles being transported in a vehicle to be kept in place and not damaged or dislodged regardless of the numerous turns, stops or other vehicle maneuvers which the driver may perform during the course of a trip;

the provision of such a restraint to also protect articles from damage in the event of an accident;

the provision of such a restraint to be a lightweight material, preferably with dull edges or covered in a fabric so to look attractive and to not damage the seat material of a car seat in which the restraint is used;

the provision of such a restraint which could also be collapsible and readily stored in a pouch or other container so the restraint can be kept under the seat of a car when not in use;

the provision of such a restraint to be sized so as to take up only the seat space normally occupied by a person sitting in the seat, and to not intrude into the space normally occupied by a driver of the vehicle or other passengers;

the provision of such a restraint in which more than one restraint can be used in a vehicle at a time so one restraint can be used in the front seat of a vehicle and one or more other restraints in the back seat of the vehicle; and, the provision of such a restraint which is a low cost unit that is easy to manufacture.

In accordance with the invention, generally stated, a package restraint is for use in automotive vehicles. The restraint is placed in a seat normally occupied by an individual and is held in place by the seat belt worn by an occupant. The restraint has a rear piece which fits against the upright portion of a passenger seat and which is held in place by the seat belt. A bottom section of the restraint provides a seat for the package or article to rest upon, and this bottom may be adjustable in length to accommodate different size packages. The restraint may also include a front section which is also an upright piece. The front and rear pieces have openings for a belt to fit through the pieces and about the package being restrained to secure the restraint and package together. The restraint is made of a lightweight, fabric covered material for ease of use and to protect the package and seat in which the restraint is used. Other objects and features will be in part apparent and in part pointed out hereinafter.

BRIEF DESCRIPTION OF THE DRAWINGS

In the drawings.

FIGS. 5A–5C illustrate various types of belts usable with the restraint, and FIG. 5D, an adjustment feature for a belt;

FIGS. 6A and 6B are respective elevational and plan views illustrating a first restraint adjustment feature to vary the size of the restraint to a package carried by the restraint;

FIGS. 7A and 7B illustrate an alternate adjustment feature;

FIG. 8A is a plan view of an alternate embodiment of the restraint, and FIG. 8B a removable top piece usable with this embodiment;

Corresponding reference characters indicate corresponding parts throughout the drawings.

DESCRIPTION OF A PREFERRED EMBODIMENT

Figure 1:
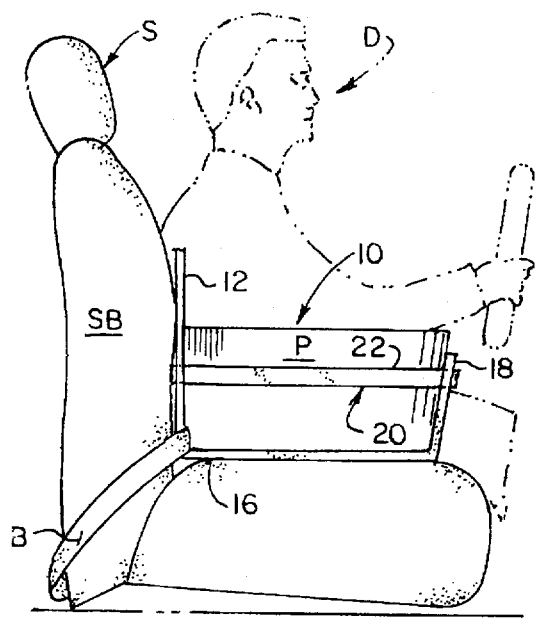
FIG. 1 is an elevational view of a front seat portion of an automotive vehicle illustrating the use of a package restraint of the present invention.

Referring to the drawings, a package restraint or article holder of the present invention is indicated generally 10.

While the package restraint is primarily designed for use in automotive vehicles such as cars, vans, or trucks, it will also be understood that the restraint could also be used in an airplane or a boat, for example, without departing from the scope of the invention. Regardless of where used, restraint 10 is used to secure a package P (see FIG. 1), files F (see FIG. 2), or other articles in place and protect them and their contents while the vehicle is in transit.

Figure 3:
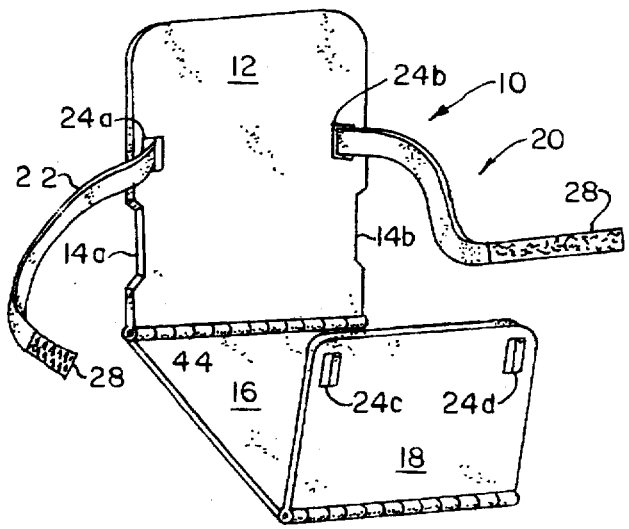
FIG. 3 is a perspective view of a first embodiment of the restraint.
Figure 4B:
FIG. 4B is a side elevational view thereof.
Figure 4A:
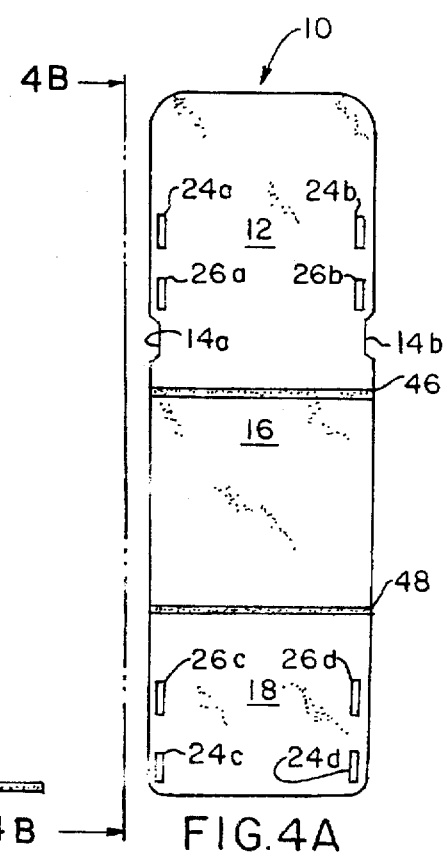
FIG. 4A is a plan view of the restraint in an unfolded position.

In FIG. 1, restraint 10 is shown to include a rear piece 12 which fits upright against the upright portion, or seat back SB, of a vehicle passenger seat S. Usually this seat is the front passenger seat of the vehicle because this arrangement may be the easiest for the driver D to access the package or file, and its contents. As shown in FIGS. 3 and 4A, rear piece 12 has openings formed by respective notches 14a, 14b in the opposite sides of the rear piece for a seat belt B, otherwise used by an occupant of the vehicle, to secure the rear piece in place in its upright position. Alternatively, these notches could be formed by slots through which the belt fits. The respective sections of the seat belt fit through the notches after the restraint is positioned in the passenger seat. The sections of the seat belt are then buckled together and the belt pulled tight across rear piece 12 to secure the restraint in the seat.

A bottom section 16 of the restraint is preferably hingedly connected to rear piece 12 at the base of the rear piece. The bottom section provides a seat or floor for the packages, flies, or articles to rest upon. A front piece 18 of the restraint is preferable hingedly connected to the other end of bottom section 16 opposite from the rear piece. As shown in the drawings, front piece 18 is also in an upright position to further provide support for a package or other articles. Next, a belt means 20 includes one or more adjustable belts 22 which extend from rear piece 12 and about front piece 18 to secure a package, files, or other articles between the front and rear pieces. In FIGS. 1 and 3, a single belt 22 is shown for this purpose; while in FIG. 2, two such belts 22a, and 22b are used. When a belt or belts 22 are fastened in place, the package is restrained from any movement in response to movements of the vehicle. Such movements include, for example, sharp turns, rapid accelerations, or abrupt stoppages which might otherwise cause an unrestrained package or article to be thrown about the seat, or on the floor of the vehicle thereby upsetting the contents of the package, or damaging or breaking an article.

Figure 2:
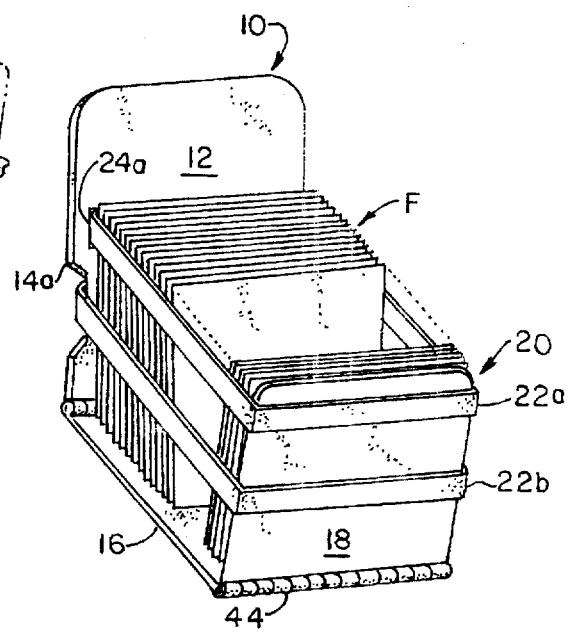
FIG. 2 is a perspective view of the restraint and a package secured in the restraint.

Both of the front and rear pieces of the restraint have openings through which sections of a belt 22 fit. As shown in FIGS. 1 and 3, where a single belt 22 is used, rear piece 12 has slots 24a, 24b, on opposite sides of the rear piece, through which belt 22 fits. Front piece 18 has corresponding slots 24c, 24d. In FIG. 2, where two belts are used, an alternate construction is shown in which one of the belts 22a simply wraps around the outside of front piece 18, so the front piece needs to have no slots or notches to accommodate the belt. Also, the other belt 22b is shown extending around rear piece 12 through the notches used for routing seat belt B across the front of the rear piece. A third construction shown in FIG. 4A includes the slots 24a–24d for use with one belt 22, with the front and rear pieces each having a second set of slots 26a–26d respectively, for use with a second belt.

As shown in FIGS. 3, and 5A–5C, the belts 22 can have different arrangements for securing one end of a belt to the other. In FIG. 3, each end of the belt has a section 28 which is a length of a Velcro material. In FIG. 5A, buttons 30 or on one end of the belt, and button holes 32 are on the other end of the belt. In FIG. 5B, mating elements of snap fittings 34 are attached to the respective ends of the belt. In FIG. 5C, one end of the belt has a buckle 36, and the other end holes 38 for the buckle to attach to. FIG. 5D illustrates a reel 42 for adjusting the length of the belt to a desired length. It will also be understood that the belt an be formed from a non-slip material so when in place, the belt will not pull away from the package or front and rear pieces.

The front and rear pieces of the restraint, and the bottom section, are made of a lightweight plastic material. Also, the respective pieces may be fabric covered so as not to rip or tear the fabric of the passenger seat. In this regard, the corners of the pieces may be rounded as shown in FIG. 11. As shown in FIGS. 1–3, the respective front and rear pieces of the restraint are hingedly connected to the bottom section. In this regard, and as shown in FIGS. 2 and 3, the respective components are separately formed with the appropriate end or ends having a hinge section 44 formed thereon for providing the hinging motion. The bottom section is movable more than 90° (see FIG. 10B) with respect to the back section. As shown in FIGS. 4A and 4B, the front and end pieces may be integrally formed, with respective lines of weakness 46, 48, scribed into the material to provide the hinge points for the restraint. It will also be understood that the front and rear pieces are of a one-piece construction and shaped as shown in FIG. 10B, but with enough flexibility that the bottom section can be readily flexed with respect to the rear piece.

Referring to FIGS. 6A and 6B, and 7A and 7B, bottom section 16 of the restraint can be a two-piece section in which one piece 16a is adjustable relative to the other section 16b. This allows the length of the restraint to be adjustable for different size packages or articles. For example, and as shown in FIGS. 6A and 6B, a slot 50 is formed along each side of section piece 16a, and piece 16b has a tab 52 which is received in the slot to allow movement of piece 16b back and forth to vary the length of the bottom section. Or, as shown in FIGS. 7A and 7B, a pocket 54 is formed in the underside of piece 16a, and piece 16b is slidable into and out of the pocket to adjust the length. It will be appreciated that other constructions (not shown) may also be used without departing from the scope of the invention.

Referring to FIGS. 8A and 8B, restraint 10 may also include a top or lid 56 whose length and width dimensions correspond to those of bottom section 16 for the top to fit over a package or article placed in the restraint. In addition, another belt 22 (not shown) may be fitted through respective openings 58a in rear piece 12, and 58b in front piece 18, to secure the top in place.

Figure 9:
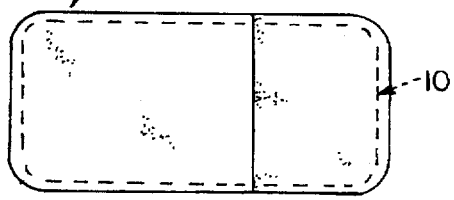
FIG. 9 illustrates a pouch for storing a restraint under a car seat or other convenient location.

As shown in FIG. 9, a pouch 60 is provided for storing the restraint when not in use. The pouch holds not only the restraint, but also the top 60, and all belts 22 used with the restraint. The pouch is sized to fit under the front, passenger seat of the vehicle, as well as in the trunk or other suitably sized storage unit.

Figure 10A:
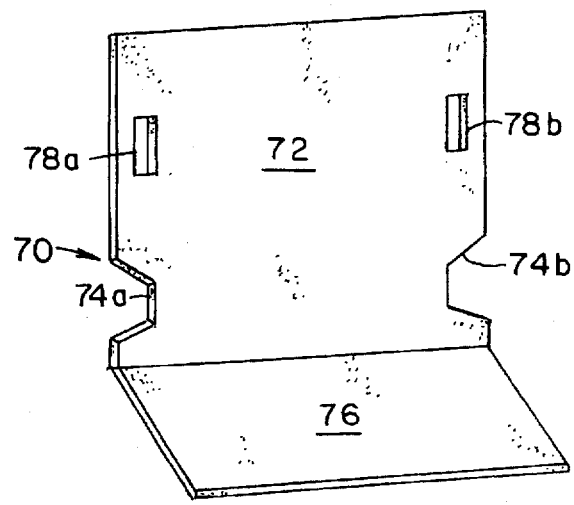
FIGS. 10A and 10B are respective perspective and elevational views of another embodiment of the invention.
Figure 10B:
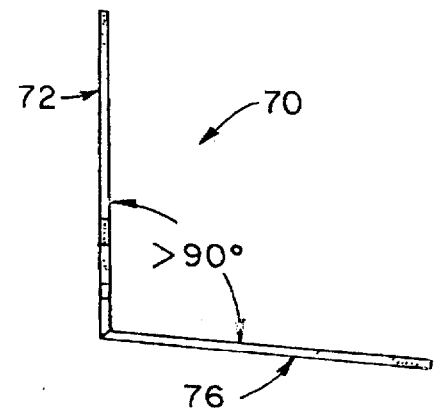
Figure 11:
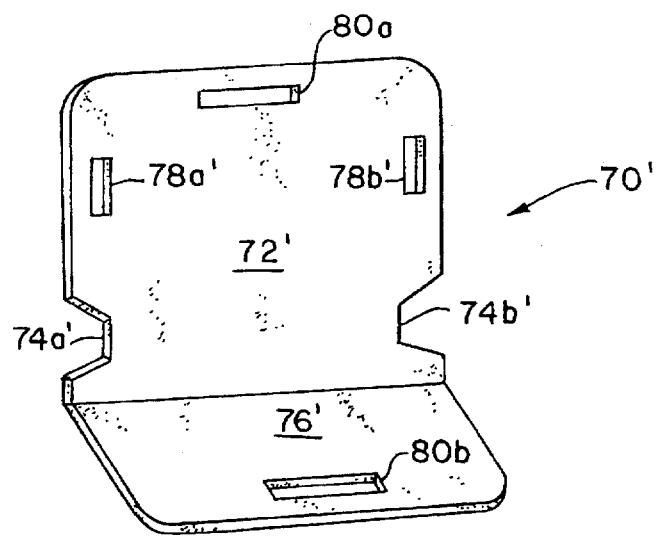
FIG. 11 is a view similar to FIG. 10A with rounded edges and a second belt attachment feature.

Referring to FIGS. 10A, 10B, and 11, another embodiment of the invention is indicated 70 and has only a back or rear section 72 and bottom section 76. Notches 74a, 74b are formed in the sides of the rear section, as are slots 78a, 78b. In the embodiment 70' of FIG. 11, the restraint has rounded edges as well as slots 80a and 80b for a belt to fit about the restraint for securing an article in place.

Finally, while only one restraint installation is shown, it will be understood that two or more restraints could be used at the same time with one restraint being used in the front seat, and the restraint or restraints in the rear seat or seats of the vehicle.

What has been described is a package restraint for usable in cars, vans, trucks, and airplanes. The restraint is held in place by a seat belt normally worn by a passenger. The restraint is an adjustable restraint and can hold different size and shape packages and articles. Use of the restraint allows packages being transported to be kept in place and not damaged or dislodged regardless of the stops and turns the driver may make during a trip. In particular, the restraint protects packages and articles from damage if an accident occurs. The restraint is of a lightweight, fabric covered material which not only looks attractive but also does not damage the car seat in which the restraint is used. The restraint collapses for easy storage in a pouch or the like which can be stored under the seat of a car when not in use. The size and shape of the restraint are such that it takes up only the seat space normally occupied by a person sitting in the seat, and does not intrude into the space normally occupied by a driver of the vehicle or other passengers. More than restraint can be used at a time, with one restraint being used in the front seat of a vehicle and other restraints in the back seat of the vehicle, and, the restraint is a low cost unit so that it is easy to have more than one available for use.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. A package restraint for use in automotive vehicles for securing a package in place and protecting the package and contents of the package while the vehicle is in transit, comprising:
   a rear piece which fits against an upright portion of a passenger seat, said rear piece being secured to said passenger seat by a seat belt otherwise used by an occupant of the vehicle;
   a bottom section connected to said rear piece and providing a seat for said package;
   a front piece connected to an end of said bottom section opposite the end thereof to which said rear piece is connected, said front piece providing support for said package;
   a first belt means extending from said rear piece and about said package to secure said package in place, said front and rear pieces having respective slot openings formed in opposite sides thereof for said first belt means to fit across the back of said rear piece, through the openings in said rear piece, through the openings in the front piece and across the front of said front piece to secure said package to said restraint, and said package, when secured to said rear piece by said belt means being restrained from any movement in response to movements of the vehicle such as turns and abrupt stoppages of the vehicle;
   a top piece fitting over the package; and,
   a second belt means for use in securing the top piece over the package, said rear and front pieces each having respective openings at an upper end thereof for said second belt means to extend therethrough.

2. The restraint of claim 1 wherein said bottom section is adjustable in length to accommodate different size packages within the restraint.

3. The restraint of claim 2 wherein said bottom section is a two-piece section one piece of which is movable with respect to the other by which the length of said bottom section is adjustable.

4. The restraint of claim 1 wherein said bottom section has a first piece in which a pocket is formed, and a second piece one end of which is slidable into said pocket with the length of said second piece slid into said pocket adjusting the overall length of said bottom section.

5. The restraint of claim 4 wherein said bottom section is a two-piece section with the respective pieces being joined together to form said bottom section, one piece of said bottom section adjustably overlaying the other piece thereof to adjust the overall length of said bottom section.

6. The restraint of claim 1 wherein said front and rear pieces, and said bottom section are formed of a sturdy, lightweight plastic material.

7. The restraint of claim 1 wherein said front and rear pieces and said bottom section are covered with a fabric material.

8. The restraint of claim 1 wherein said rear piece has respective notches formed in the sides thereof to form openings for the seat belt to be drawn across an outer face of said rear piece so when the seat belt is buckled, the rear piece is secured to said seat.

9. The restraint of claim 1 further including a third belt means for use in securing the package in place, said rear and front pieces each having respective openings for said second belt means to extend therethrough.

10. The restraint of claim 1 wherein each said belt means comprises a belt adjustable to accommodate the size of the package.

11. The restraint of claim 10 wherein said belt includes sections of a Velcro material at each end for securing said belt about the package.

12. The restraint of claim 10 wherein said belt has snap fittings at each end for securing said belt about the package.

13. The restraint of claim 10 wherein said belt has a buckle for securing said belt about the package.

14. The restraint of claim 10 wherein said belt has buttons at one end thereof and buttons holes formed in the other end thereof for securing said belt about the package.

15. The restraint of claim 10 wherein said belt has a non-slip surface to prevent the belt from slipping off the package.

16. The restraint of claim 1 further including a pouch for storing said restraint under a seat of the vehicle.

17. The restraint of claim 1 wherein said front piece and said rear piece are each hingedly connected to said bottom section.

* * * * *